(12) United States Patent
Slick et al.

(10) Patent No.: US 7,305,556 B2
(45) Date of Patent: Dec. 4, 2007

(54) SECURE PRINTING WITH AUTHENTICATED PRINTER KEY

(75) Inventors: Royce E. Slick, Mission Viejo, CA (US); William Zhang, Irvine, CA (US); Don Francis Purpura, Yorba Linda, CA (US); Neil Y. Iwamoto, Mission Viejo, CA (US); Craig Mazzagatte, Aliso Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 10/010,974

(22) Filed: Dec. 5, 2001

(65) Prior Publication Data

US 2003/0105963 A1   Jun. 5, 2003

(51) Int. Cl.
*H04L 9/00* (2006.01)
(52) U.S. Cl. ............... 713/169; 713/168; 713/171
(58) Field of Classification Search ......... 713/168, 713/171, 169
See application file for complete search history.

(56) References Cited

U.S. PATENT DOCUMENTS

| | | | |
|---|---|---|---|
| 5,005,200 A * | 4/1991 | Fischer ............... | 380/30 |
| 5,392,351 A * | 2/1995 | Hasebe et al. ....... | 705/51 |
| 5,398,283 A * | 3/1995 | Virga .................. | 380/243 |
| 5,539,824 A * | 7/1996 | Bjorklund et al. .... | 380/249 |
| 5,633,932 A * | 5/1997 | Davis et al. ......... | 713/176 |
| 5,680,458 A | 10/1997 | Spelman et al. ..... | 380/21 |
| 5,720,012 A * | 2/1998 | McVeigh et al. ..... | 358/1.14 |
| 5,898,779 A | 4/1999 | Squilla et al. ....... | 380/23 |
| 5,905,801 A | 5/1999 | Serinken ............. | 380/51 |
| 5,933,498 A * | 8/1999 | Schneck et al. ...... | 705/54 |
| 5,949,881 A * | 9/1999 | Davis ................. | 713/189 |

(Continued)

FOREIGN PATENT DOCUMENTS

CH   1249096   3/2000

(Continued)

OTHER PUBLICATIONS

Menezes et al., Handbook of Applied Cryptography, CRC Press, 1996, chapters 8-9 and 11, pp. 283-383, 425-488.*

(Continued)

*Primary Examiner*—Nasser Moazzami
*Assistant Examiner*—David Garcia Cervetti
(74) *Attorney, Agent, or Firm*—Fitzpatrick, Cella, Harper & Scinto

(57) ABSTRACT

Securely storing a public key for encryption of data in a computing device by using a user-specific key pair which is securely stored in the computing device, including receiving a target public key corresponding to a target device, obtaining a user-specific key pair from a secure registry, using a user-specific private key from the user-specific key pair to create a target key verifier based on the target public key, storing the target key verifier and the target public key in a storage area, retrieving the target key verifier and the target public key from the storage area, applying a user-specific public key from the user-specific key pair to the target key verifier for verifying the authenticity of the target public key, and encrypting data with the target public key, if authenticity of the target public key is verified, thereby creating encrypted data for transmission to the target device.

25 Claims, 15 Drawing Sheets

U.S. PATENT DOCUMENTS

| | | | | |
|---|---|---|---|---|
| 5,953,419 | A * | 9/1999 | Lohstroh et al. | 713/165 |
| 5,970,147 | A * | 10/1999 | Davis | 713/172 |
| 6,029,137 | A * | 2/2000 | Cordery et al. | 705/1 |
| 6,041,704 | A | 3/2000 | Pauschinger | 101/91 |
| 6,058,478 | A | 5/2000 | Davis | 713/191 |
| 6,061,448 | A | 5/2000 | Smith et al. | 380/21 |
| 6,064,989 | A * | 5/2000 | Cordery et al. | 705/50 |
| 6,070,245 | A | 5/2000 | Murphy, Jr. et al. | 713/201 |
| 6,073,125 | A | 6/2000 | Cordery et al. | 705/60 |
| 6,088,684 | A | 7/2000 | Custy et al. | 705/35 |
| 6,144,950 | A * | 11/2000 | Davies et al. | 705/401 |
| 6,148,387 | A * | 11/2000 | Galasso et al. | 711/203 |
| 6,178,412 | B1 * | 1/2001 | Ratzenberger, Jr. et al. | 705/408 |
| 6,188,997 | B1 * | 2/2001 | Ratzenberger, Jr. et al. | 705/410 |
| 6,199,049 | B1 | 3/2001 | Conde et al. | 705/24 |
| 6,314,521 | B1 * | 11/2001 | Debry | 726/10 |
| 6,343,361 | B1 * | 1/2002 | Nendell et al. | 713/171 |
| 6,353,888 | B1 * | 3/2002 | Kakehi et al. | 713/168 |
| 6,370,247 | B1 * | 4/2002 | Takaragi et al. | 380/28 |
| 6,378,070 | B1 * | 4/2002 | Chan et al. | 713/155 |
| 6,385,728 | B1 * | 5/2002 | DeBry | 726/9 |
| 6,389,535 | B1 * | 5/2002 | Thomlinson et al. | 713/165 |
| 6,430,690 | B1 | 8/2002 | Vanstone et al. | 713/182 |
| 6,466,921 | B1 | 10/2002 | Cordery et al. | 705/60 |
| 6,470,450 | B1 * | 10/2002 | Langford et al. | 713/182 |
| 6,473,508 | B1 * | 10/2002 | Young et al. | 380/30 |
| 6,480,831 | B1 * | 11/2002 | Cordery et al. | 705/60 |
| 6,615,352 | B2 * | 9/2003 | Terao et al. | 713/184 |
| 6,628,413 | B1 * | 9/2003 | Lee | 358/1.15 |
| 6,694,434 | B1 * | 2/2004 | McGee et al. | 713/189 |
| 6,711,677 | B1 * | 3/2004 | Wiegley | 713/151 |
| 6,711,680 | B1 * | 3/2004 | Cordery | 713/176 |
| 6,766,306 | B1 * | 7/2004 | Matsuyama | 705/53 |
| 6,862,583 | B1 * | 3/2005 | Mazzagatte et al. | 705/64 |
| 6,918,042 | B1 * | 7/2005 | Debry | 726/5 |
| 6,965,996 | B2 * | 11/2005 | Hirano et al. | 713/176 |
| 6,971,007 | B1 * | 11/2005 | Currans | 713/165 |
| 6,978,017 | B2 * | 12/2005 | Wiener et al. | 380/30 |
| 7,003,667 | B1 * | 2/2006 | Slick et al. | 713/182 |
| 7,020,773 | B1 * | 3/2006 | Otway et al. | 713/171 |
| 7,020,781 | B1 * | 3/2006 | Saw et al. | 705/51 |
| 7,039,802 | B1 * | 5/2006 | Eskicioglu et al. | 713/156 |
| 7,062,651 | B1 * | 6/2006 | Lapstun et al. | 713/168 |
| 7,073,073 | B1 * | 7/2006 | Nonaka et al. | 713/193 |
| 7,076,656 | B2 * | 7/2006 | MacKenzie | 713/171 |
| 7,093,128 | B2 * | 8/2006 | Asano et al. | 713/171 |
| 7,099,846 | B1 * | 8/2006 | Ishibashi et al. | 705/51 |
| 7,103,778 | B2 * | 9/2006 | Kon et al. | 713/185 |
| 2001/0021926 | A1 * | 9/2001 | Schneck et al. | 705/54 |
| 2002/0016921 | A1 * | 2/2002 | Olsen et al. | 713/200 |
| 2002/0042884 | A1 * | 4/2002 | Wu et al. | 713/201 |
| 2002/0080959 | A1 * | 6/2002 | Weller | 380/55 |
| 2003/0014640 | A1 * | 1/2003 | Loyd | 713/182 |
| 2003/0044009 | A1 * | 3/2003 | Dathathraya | 380/55 |
| 2003/0074327 | A1 * | 4/2003 | Meadow et al. | 705/75 |
| 2003/0208691 | A1 * | 11/2003 | Smart et al. | 713/201 |

FOREIGN PATENT DOCUMENTS

| | | |
|---|---|---|
| EP | 929023 A1 * | 7/1999 |
| EP | 935182 A1 * | 8/1999 |
| EP | 1091285 | 4/2001 |
| JP | 2001-507528 | 6/2001 |

OTHER PUBLICATIONS

Menezes et al., Handbook of Applied Cryptography, CRC Press, 1996, chapters 8-9 and 11, pp. 283-383, 425-488.*

Morris et al., "Andrew: A Distributed Personal Computing Environment", Communications of the ACM, vol. 29, No. 3, Mar. 1986, pp. 184-201.

"Making E-Mail Secure; Private-key Portability", http://www.zdnet.com/devhead/stories/articles/0,4413,2143861,00.html, visited Dec. 17, 2001.

"Making E-Mail Secure; Clear vs. Opaque Signing", http://www.zdnet.com/devhead/stories/articles/0,4413,2143859,00.html, visited Dec. 17, 2001.

"Microsoft Cryptographic System", http://msdn.microsoft.com/library/en-us/wcesecur/htm/crypto_2.asp?frame=true, visited Dec. 17, 2001.

* cited by examiner

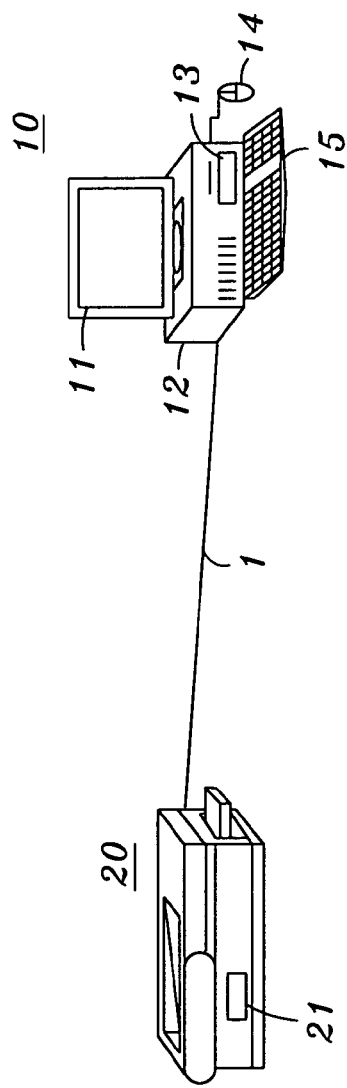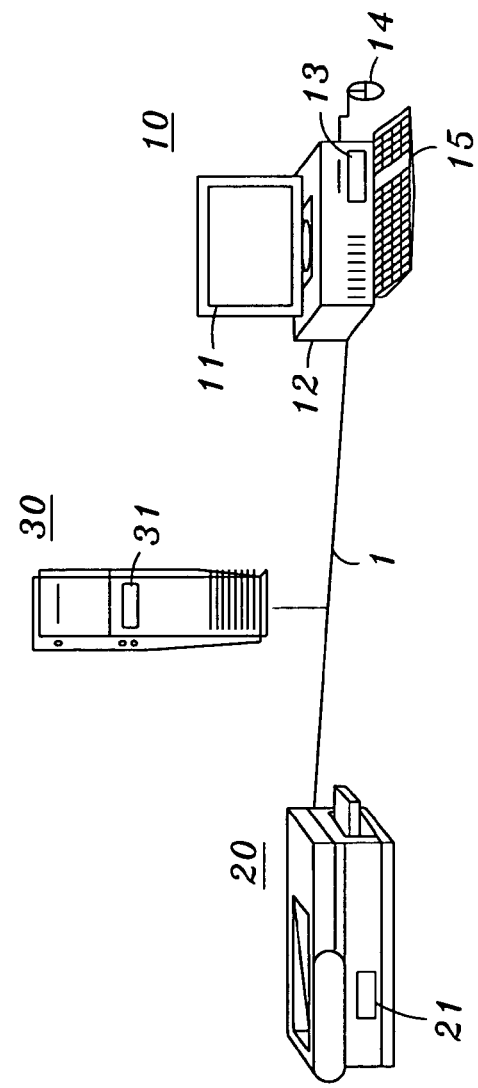

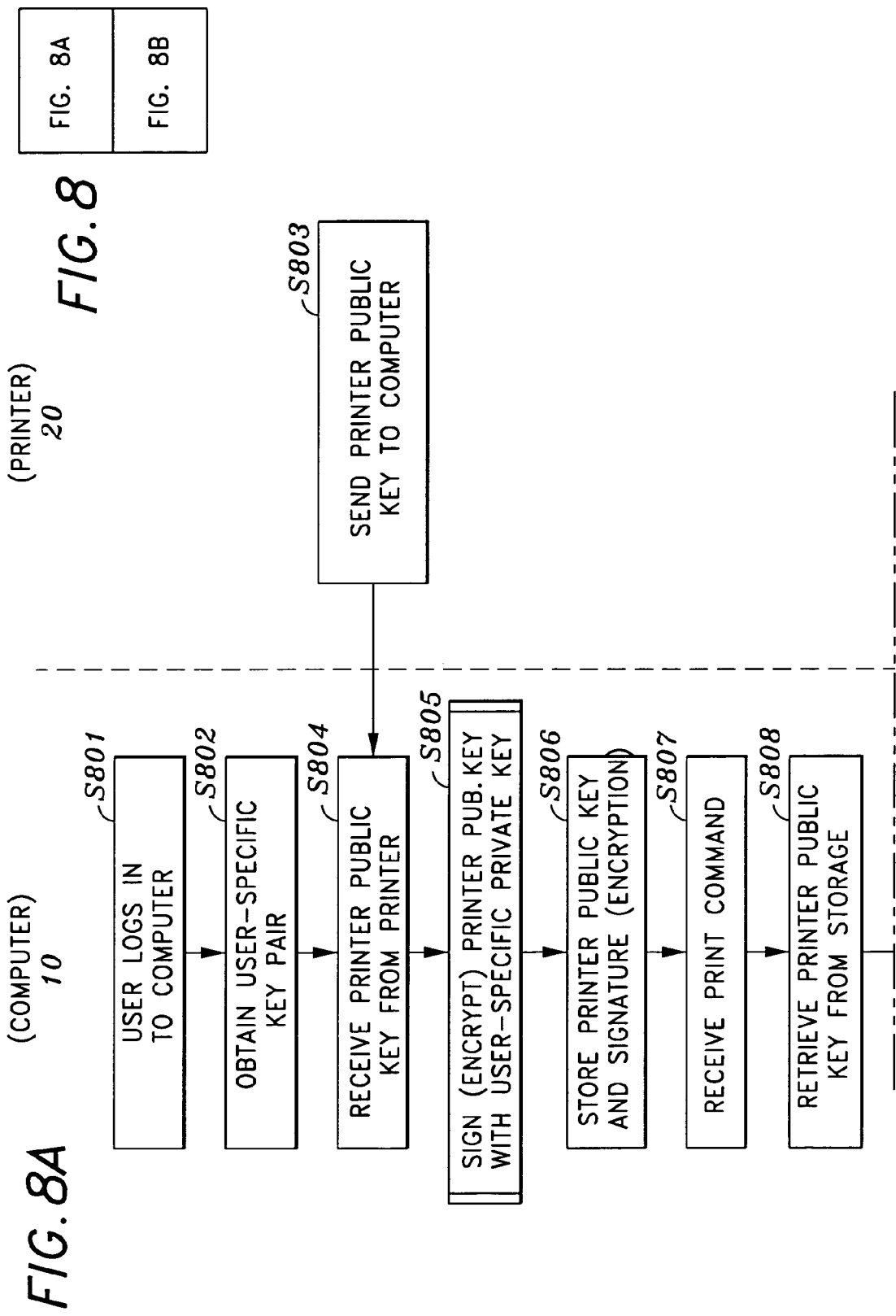

SECURE PRINTING WITH AUTHENTICATED PRINTER KEY

Incorporation by Reference

U.S. patent application Ser. No. 09/411,070, entitled "Targeted Secure Printing", filed on Oct. 4, 1999, is incorporated herein by reference.

BACKGROUND OF THE INVENTION

1. Field of the Invention

The present invention concerns secure printing by encrypting print data using a verified printer key, without the need for an external certificate authority. In particular, the invention concerns using a user-specific private key to create an encrypted key version of a stored printer public key. When the printer public key is subsequently needed for encryption of print data, the encrypted key version is decrypted using a user-specific public key and is then compared to the stored printer public key to verify that the stored printer public key was not changed or corrupted.

2. Description of the Related Art

In computing environments, a print job generated by a computer at one location in the network can be printed by an image output device at another location. For example, a personal computer (PC) may be connected to a printer at a distant location, or a workstation may be connected to a network on which many devices and workstations reside. If the print job includes confidential or otherwise sensitive information, it is possible that there may be an unauthorized interception of the print job between the origin of the print job and the targeted printer. In particular, the print job may be intercepted by an unauthorized device connected to a local connection between an originating PC and the target printer, or by a device connected to the network on which an originating workstation and the target printer reside. Such an unauthorized device may be a PC or a workstation capable of utilizing network listening, trapping and interception tools.

To avoid unwanted interception or retrieval of print jobs, it is known to use secure printing in which a public printer key is utilized to encrypt print data at the originating computer. In some applications, the public printer key may be used in conjunction with a symmetric key to encrypt the print data. The encrypted print data is sent to the target printer where the printer private key is used to decrypt the print data and to store it. The printer private key is maintained in the printer in a secure fashion to ensure security of encrypted print data. It is preferable for a computing device to obtain the printer public key and store it, but the printer public key should be verified each time it is used to encrypt print data, to make sure that the printer public key has not been corrupted or tampered with.

Certificate authorities are often used to facilitate the secure distribution and verification of public keys for encryption purposes. A certificate authority is a trusted party that can sign a unique public key for a developer or manufacturer, such as a printer manufacturer, for secure distribution to users. For example, a certificate authority can use its own private key to sign a printer public key from a printer manufacturer by placing the printer public key in a certificate for distribution, along with other information related to the source of the printer public key and the certificate authority, and then signing the entire certificate. Users can then access the certificate containing the signed printer public key for use. In such a case, the user obtains the certificate authority's own trusted public key (verification key) and uses it to verify that the signed printer public key is authentic. The printer public key can then be trusted by the user for encryption of the user's print data to be printed on the target printer containing the corresponding printer private key.

In many cases, it is not practical for a user wishing to use a public key for a device, such as a printer public key, to utilize a certificate from a certificate authority to verify the authenticity of the public key. For example, certificate authorities are known to change their verification key from time to time to maintain integrity of the certificates. Additionally, the certificates may expire or be revoked by the certificate authority. In order to ensure the integrity of the certificates, a certificate revocation list (CRL) must be checked before relying on the integrity of the certificates. Unfortunately, it takes time for a user to obtain the certificate authority's verification key every time a user wishes to use a particular public key for encryption purposes.

In addition, not every device necessarily uses a certificate authority for the distribution of the device's public key. Also, a user may be required to store and maintain numerous verification keys from corresponding certificate authorities for supporting different public keys needed by the user's applications. Lastly, certificates from certificate authorities often contain additional information besides a signed public key, and the processing of this additional information can result in greater processing overhead in verification of the signed public key.

SUMMARY OF THE INVENTION

Accordingly, what is needed is an arrangement for securely maintaining a public key on a computing device wherein the public key can be easily verified before each use without the need for a certificate or a certificate authority.

The invention addresses the foregoing need by obtaining a public key from a target device, such as a printer, and storing the public key. A user-specific private key from a user-specific key pair is used to create a target key verifier corresponding to the public key. In this regard, the target key verifier can be any one of several types of data objects for purposes of the present invention. For example, the target key verifier can be comprised of an encrypted public key, a digital signature of the public key, or another resultant data object resulting from the application of a security algorithm, such as DSS, to the public key. When the public key is subsequently needed for encryption purposes, the target key verifier is decrypted using a user-specific public key from the user-specific key pair and is then compared to the stored public key to verify that the stored public key has not been changed or corrupted.

Accordingly, one aspect of the present invention concerns securely storing a public key for encryption of data in a computing device by using a user-specific key pair which is securely stored in the computing device. In particular, a target public key corresponding to a target device is received, a user-specific key pair is obtained from a secure registry and a user-specific private key from the user-specific key pair is used to create a target key verifier based on the target public key. The target key verifier and the target public key are stored in a storage area. The target key verifier and the target public key are subsequently retrieved from the storage area. A user-specific public key from the user-specific key pair is applied to the target key verifier for verifying the authenticity of the target public key, and, in the case that the authenticity of the target public key is verified, data is encrypted with the target public key, thereby creating encrypted data for transmission to the target device.

Preferably, the user-specific key-pair is generated and securely maintained by the operating system which is executing in the computing device. For example, the operating system preferably maintains a secure registry which stores user-specific key pairs for each user and which only allows access to a user-specific key pair when provided with an appropriate login identification of the user corresponding to the user-specific key pair. Also, the target key verifier is preferably a public key signature which is created by hashing the target public key and then encrypting the resulting first key hash with the user-specific private key from the user-specific key pair. The verification step preferably includes decrypting the target key verifier with the user-specific public key from the user-specific key pair to retrieve the first key hash. A second key hash is obtained by hashing the stored target public key, and the first and second key hashes are compared to verify the authenticity of the stored target public key. Also, in the receiving step, the target public key is preferably received in response to a request from the computing device to the target device.

By virtue of the foregoing arrangements, a target public key can be securely maintained on a computing device for subsequent use to encrypt data. In particular, the encryption (signing) and subsequent verification of the target public key with the locally maintained user-specific key pair allows the target public key to be easily verified before each use without the need for an external digital certificate or certificate authority.

In another aspect, the invention concerns securely storing a printer public key for encryption of print data in a computing device by using a user-specific key pair which is securely stored in the computing device. In particular, a printer public key corresponding to a printer is received, and a user-specific key pair is obtained from a secure registry upon receipt of a corresponding user identification. A hashing algorithm is applied to the printer public key to create a first printer key hash, and an encryption algorithm is applied to encrypt the first printer key hash with a user-specific private key from the user-specific key pair, thereby creating a printer key signature. The printer key signature and the printer public key are stored in a storage area. The printer key signature and the printer public key are subsequently retrieved from the storage area. The hashing algorithm is applied to the retrieved printer public key to create a second printer key hash, and a decryption algorithm is applied to decrypt the printer key signature with a user-specific public key from the user-specific key pair, thereby retrieving the first printer key hash. A verification algorithm is applied to compare the first printer key hash with the second printer key hash, for verifying the authenticity of the retrieved printer public key, and, in the case that the authenticity of the retrieved printer public key is verified, an encryption algorithm is applied to print data using the retrieved printer public key to create encrypted print data for transmission to the printer.

Preferably, the user-specific key-pair obtained in the obtaining step is generated and securely maintained by the operating system which is executing in the computing device. For example, the operating system preferably maintains a secure registry which stores user-specific key pairs for each user and which only allows access to a user-specific key pair when provided with an appropriate login identification of the user corresponding to the user-specific key pair. Also, in the receiving step, the printer public key is preferably received in response to a key request which is sent from the computing device to the printer.

By virtue of the foregoing arrangements, a printer public key can be securely maintained on a computing device for subsequent use to encrypt data. In particular, the signing and subsequent verification of the printer public key with the locally maintained user-specific key pair allows the printer public key to be easily verified before each use without the need for an external digital certificate or certificate authority.

According to yet another aspect of the invention, a printer public key received by a computing device is authenticated. In particular, the computing device receives a printer public key corresponding to a printer, and a hashing algorithm is applied to the printer public key to create a first printer key hash. The computing device receives a predetermined second printer key hash obtained from a test page printed by the printer, wherein the second printer key hash is input into the computing device by a user-input means connected to the computing device. A verification algorithm is then used to compare the first printer key hash with the second printer key hash, for verifying the authenticity of the received printer public key, and, in the case that the authenticity of the received printer public key is verified, the received printer public key is stored in a memory area of the computing device.

Preferably, the received printer public key is received in response to a key request message sent from the computing device to the printer. In addition, the test page is preferably printed in response to a command from a user of the computing device, the command being directly entered by the user through a front panel of the printer. The user-input means is preferably a keyboard and mouse, to that the user can view the predetermined second printer key hash from the test page and then enter the predetermined second printer key hash into the computing device.

By virtue of the foregoing arrangements, a printer public key can be authenticated upon initial receipt from a printer by a user of the printer. In particular, the authentication of the received printer public key is performed by using a predetermined hash value printed by the printer in the presence of the user. In this manner, the authenticity of the printer public key is easily verified upon receipt without the need for an external digital certificate or certificate authority.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 1 is a representative view of a computing environment in which the present invention may be implemented according to one embodiment of the invention.

FIG. 2 is a representative view of a networked computing environment in which the present invention may be implemented according to another embodiment of the invention.

DETAILED DESCRIPTION OF THE PREFERRED EMBODIMENTS

Figure 3:
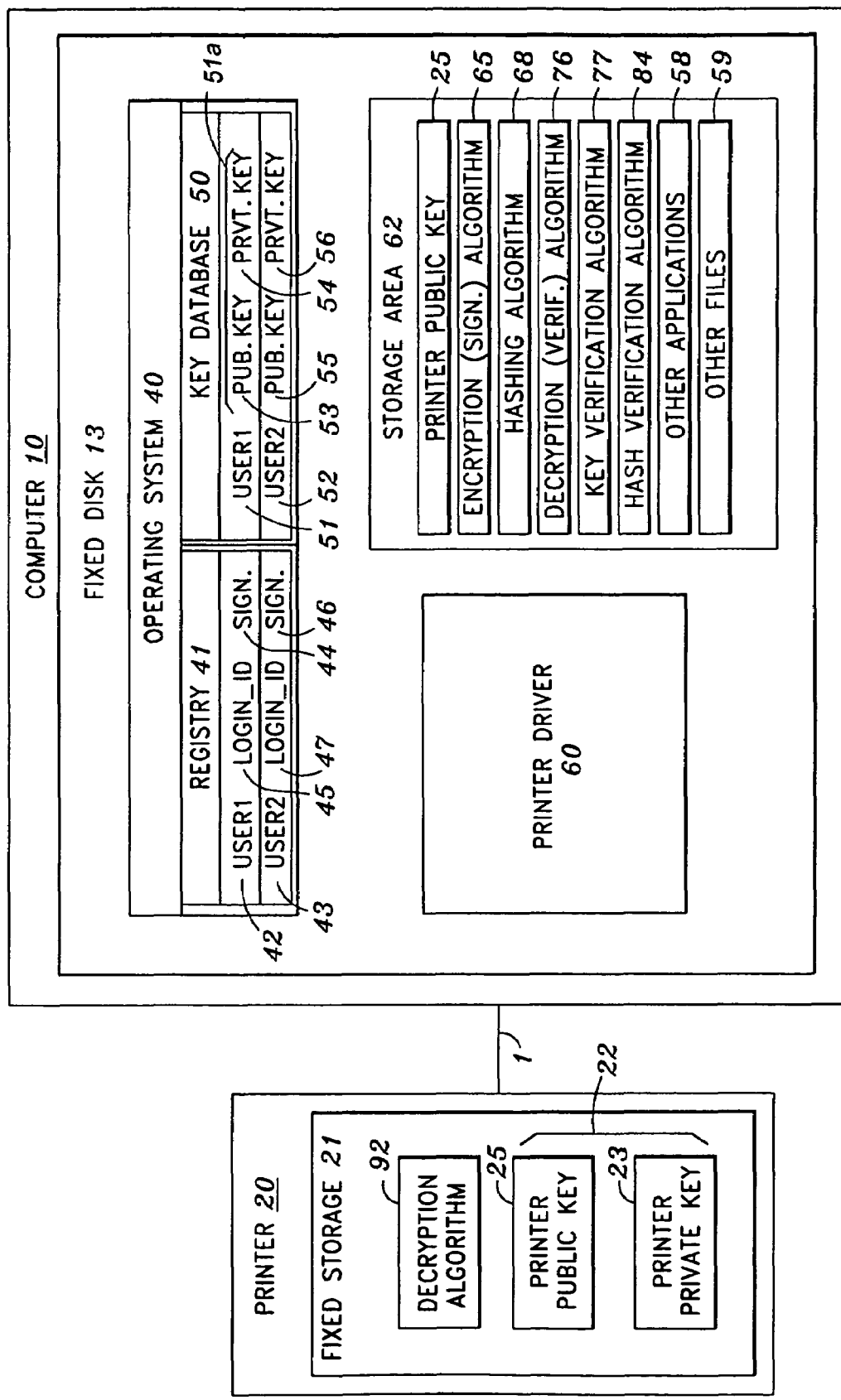
FIG. 3 is a detailed block diagram showing the internal architecture of the computer and the printer shown in FIG. 1.

FIG. 1 provides a system view of a computing environment in which the present invention may be implemented. As shown in FIG. 1, the computing environment comprises computer 10, printer 20, and connection 1. Connection 1 can be a simple local connection between computer 10 and printer 20, such as a serial, USB, firewire, or other such connection. In the alternative, connection 1 may be a network, such as an Ethernet network medium consisting of a bus-type physical architecture. It should be appreciated that connection 1 may be also be comprised of another type of network, including the internet.

Desktop computer 10 is preferably a personal computer or workstation having a windowing operating system environment such as Microsoft Windows 2000, Microsoft Windows ME or Microsoft Windows XP. As is typical with PC-type computers, desktop computer 10 preferably has display 11, keyboard 15, mouse 14, host processor 12, fixed disk 13, and a floppy drive and/or other type of storage medium (not shown). The contents of fixed disk 13 and the operation of computer 10 according to the present invention are explained in more detail below.

Printer 20 is also connected to computer 10 by connection 1 and is preferably a laser or an ink-jet printer which is capable of printing images on recording medium based on received print data. Printer 20 has a fixed storage 21 which is preferably a fixed disk, but can be another form of computer memory such as read-only memory (ROM) or electrically-erasable programmable read-only memory (EE-PROM). The contents of fixed storage 21 and the operation of printer 20 according to the present invention are discussed in more detail below.

FIG. 2 provides a system view of a networked computing environment in which the present invention may be implemented. As shown in FIG. 1, the computing environment comprises computer 10, printer 20, server 30 and connection 1. Computer 10 and printer 20 are the same in FIG. 2 as described above with respect to FIG. 1. However, connection 1 in FIG. 2 is preferably a network connection, such as an Ethernet network medium consisting of a bus-type physical architecture.

As seen in FIG. 2, server 30 is also connected to connection 1. Server 30 preferably comprises a PC-compatible computer having a windowing operating system environment such as Microsoft Windows 2000, Microsoft Windows ME or Microsoft Windows XP. Server 30 has a fixed disk 31 which is preferably a large fixed disk for storing numerous files, applications and data. Server 30 can therefore be utilized by other devices on connection 1, such as computer 10, as a file server or other type of server, such as a print server. Server 30 may also act as a gateway for other devices on connection 1 to access another network such as the Internet. In one embodiment of the present invention, server 30 is used to store public keys for use by computer 10, as discussed in more detail below.

FIG. 3 provides a view for explaining the internal contents of fixed disk 13 of computer 10, and of fixed storage 21 of printer 20. Although the present invention can be practiced with devices other than printers, the implementation of the invention for use with a printer is described herein. As seen in FIG. 3, fixed storage 21 of printer 20 includes a printer key pair 22 which is comprised of printer public key 25 and printer private key 23. Keys 25 and 23 are cryptographic keys which are used for the encryption and decryption, respectively, of print data. In particular, printer public key 25 is preferably created and maintained by the manufacturer of printer 20, or can be installed on printer 20 by a system administrator or other system user of printer 20. In another alternative, printer public key 25 can be generated by printer 20 itself.

Printer public key 25 is made accessible to the public for use in the encryption of print data to send to printer 20 in a secure, encrypted manner. Printer private key 23 is also a cryptographic key which corresponds to printer public key 25, and is also created by the creator of printer public key 25. However, unlike printer public key 25, printer private key 23 is maintained under strict security within printer 20 and cannot be accessed and/or removed from printer 20. In this manner, only printer 20 has access to both of keys 23 and 25 of printer key pair 22, thereby allowing users of printer 20 to trust that encrypted print data sent to printer 20 cannot be decrypted by any unauthorized party if the encrypted print data should be intercepted on its way to printer 20.

Returning to FIG. 3, it can be seen that fixed disk 13 of computer 10 includes operating system 40, registry 41, key database 50, printer driver 60 and storage area 62. As discussed above, operating system 40 is preferably a windowing operating system, and in particular is preferably a Microsoft Windows operating system which includes a cryptographic application programming interface (CAPI). The Microsoft CAPI provides a transparent manner for generating, maintaining and accessing user-specific cryptographic key pairs in an efficient and transparent manner. In particular CAPI generates a user-specific key pair for each user of computer 10 and stores each user-specific key pair in a registry entry for the particular corresponding user. CAPI does not allow a user-specific key pair to be accessed unless the corresponding user is logged into computer 10 by providing appropriate user login identification, such as a user-specific password. A function call is supported by CAPI to retrieve a user-specific key pair for an authorized user.

CAPI also supports other cryptographic function calls, such as a function call for verification of the authenticity of data, such as a public key, which has been encrypted or signed with a user-specific public key.

Although applications exist, such as PGP ("pretty good privacy"), for supporting the cryptographic signature of data and the subsequent verification of a cryptographic signature, such applications are seen to have a significant shortcoming with respect to the Microsoft Windows CAPI functionality. In particular, other cryptographic applications, such as PGP, require the user of the application to maintain the storage of the key pair that is used to create the cryptographic signature. Accordingly, such applications do not maintain the key pair under strict security and may be more prone to a security breach in which an unauthorized user of the computer can access the key pair and use it to access encrypted data of the authorized user.

It should be appreciated that although it is preferred to use a Microsoft Windows operating system which supports CAPI, other types of operating systems can be used to practice the present invention. In such a case, the generation, maintenance and access of user-specific key pairs as described above can be performed by functions of the other type of operating system, or can be performed by an application, so long as the user-specific key pairs are generated, maintained and accessed in a secure fashion which is transparent to the user, as described with respect to CAPI.

Returning to FIG. 3, key database 50 is a component of operating system 40 and is used to securely generate and maintain user-specific key pairs for the users of computer 10. In particular, key database 50 contains a user entry for each user of computer 10, each user entry containing a corresponding user-specific key pair, such as user-specific key pair 51a which is in the entry corresponding to user1 51. Each user-specific key pair contains a private key and a public key for encryption/signing of data objects and for authenticity verification of such encrypted/signed data objects. For example, user-specific key pair 51 includes user-specific public key 53 and user-specific private key 54, both of which are unique and correspond to user1 51.

Likewise, key database 50 may include entries for other users, such as user2 52 with public key 55 and private key 56.

Registry 41 is a storage area for use by operating system 40 to maintain data corresponding to each user of computer 10. In particular, registry 41 contains an entry for each user, in which login identification data is stored, and other user-specific data is stored. For example, the entry for user1 (42) of registry 41 includes login id 45 and digital signature 44. Login id 45 is preferably a password which is used by user1 to login to computer 10 and which is known only to user1 for security purposes. Digital signature 44 is a target key verifier for verifying the authenticity of a target key, such as printer public key 25. Digital signature 44 is preferably a digital signature which was created by user-specific key pair 51 corresponding to user1 and is maintained in registry 41. In the alternative, digital signature 44 can be comprised of an encrypted version of the target key, or can be comprised of a resultant code obtained from applying a security algorithm, such as DSS, to the target key. Digital signature 44 is discussed in more detail below.

Likewise, registry 41 may include entries for other users, such as user2 43 which includes a login ID 47 and a digital signature 46 which function in the same way as the corresponding entries for user1 42.

Also seen in FIG. 3 is printer driver 60 which is used for generating print data to be sent to printer 20 for printing of an image which may be a text document, a picture, graphic or other type of image. Printer driver 60 preferably corresponds to printer 20 for optimal printing quality and for supporting the features and characteristics of printer 20. In the preferred embodiment of the invention, printer driver 60 contains the software code for implementing the functionality of the present invention, which is discussed in more detail below.

Storage area 62 of FIG. 3 is a general storage area of fixed disk 13 for access by printer driver 60, which is not necessarily secure. Storage area 62 includes printer public key 25, encryption (signing) algorithm 65, hashing algorithm 68, decryption (verification) algorithm 76, key verification algorithm 77, hash verification algorithm 84, other applications 58 and other files 59. Printer public key 25 was obtained from printer 20 for use in encrypting print data, as discussed further below.

Encryption (signing) algorithm 65 is used by printer driver 60 to encrypt or digitally sign data objects, such as print data and printer public key 25. In addition, encryption (signing) algorithm 65 as used in the present invention can be comprised of other types of security algorithms. Hashing algorithm 68 is used to perform a digital hash of data objects, such as printer public key 25, as discussed further below. Decryption (verification) algorithm 76 is used to decrypt encrypted data objects, or to verify the digital signature of signed data objects, such as printer public key 25, and is discussed further below. In addition, decryption (verification) algorithm 76 as used in the present invention can be comprised of other types of security algorithms. Key verification algorithm 77 is used to compare a decrypted public key to a stored public key to confirm the authenticity of the stored public key, as discussed more fully below. Hash verification algorithm 84 is used to compare a decrypted public key hash value to a newly-generated hash value of a stored public key to confirm the authenticity of the stored public key, as discussed more fully below. Lastly, other applications 58 and other files 59 are used by printer driver 60 and/or computer 10 to support other applications and functions.

Figure 4A:
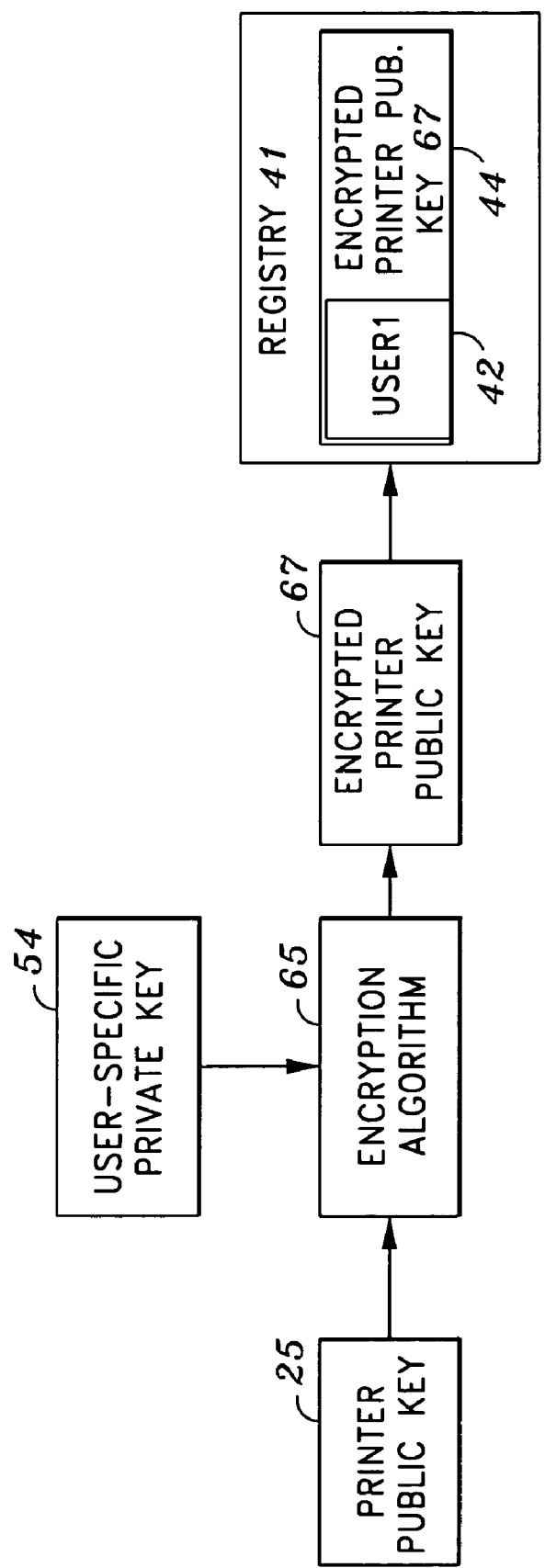
FIG. 4A is a block diagram for explaining the encryption of a public key according to one embodiment of the present invention.

FIG. 4A is a block diagram which depicts the manner in which printer public key 25 is securely stored according to one embodiment of the present invention. First, printer public key 25 is preferably obtained from printer 20 in response to a key request from computer 10. In the alternative environment depicted in FIG. 2, printer public key 25 can be obtained from server 30 in response to a key request from computer 10; server 30 having previously obtained printer public key 25 from printer 20. As seen in FIG. 4A, user-specific private key 54 is provided to encryption algorithm 65 along with printer public key 25 to generate encrypted printer public key 67, which is then stored in registry 41 under user1 entry 42 in subentry 44. As discussed above, user-specific private key 54 is preferably accessed through operating system 40 based on login id 45 for user1. In this manner, printer public key 25 is securely stored in registry 41 in an encrypted fashion for subsequent use to authenticate a stored version of printer public key 25 before using printer public key 25 to encrypt print data.

Figure 4B:
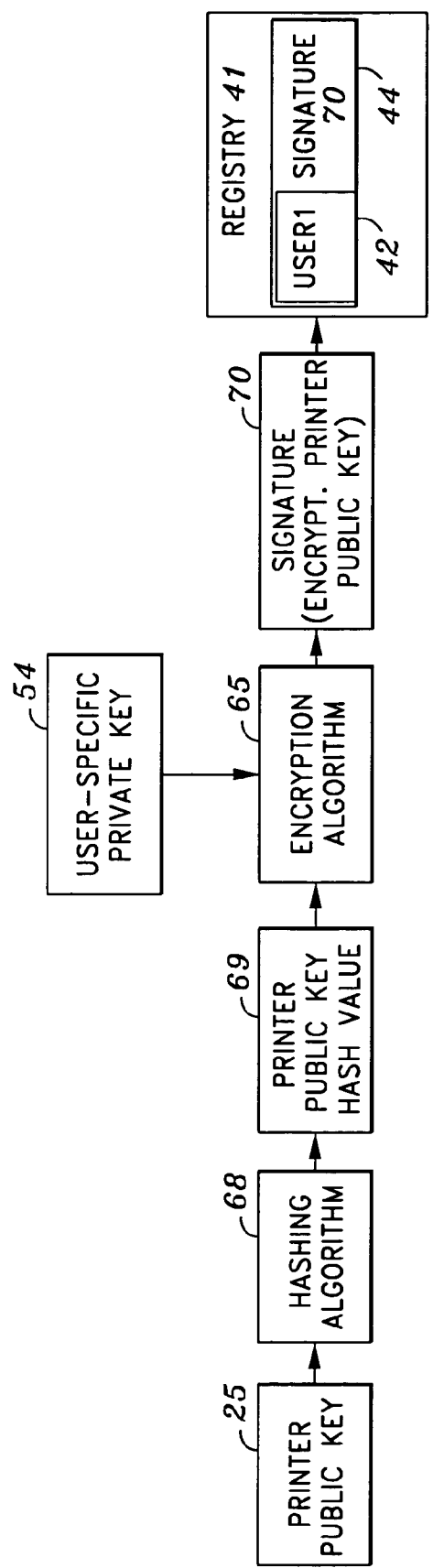
FIG. 4B is a block diagram for explaining the encryption of a public key according to another embodiment of the present invention.

FIG. 4B depicts another embodiment of the present invention, in which printer public key 25 is digitally signed instead of being fully encrypted. The signing method is preferred to full encryption because signing uses less processing overhead than full encryption. As seen in FIG. 4B, printer public key 25 is first obtained, either directly from printer 20 or from server 30, depending on the computing environment of computer 10. Printer public key 25 is then subjected to digital hashing algorithm 68 which generates unique printer public key hash value 69 for printer public key 25. Hashing algorithm 68 is preferably a known type of hashing algorithm which creates a hash value corresponding to the data object to which it is applied.

User-specific private key 54 is then provided to encryption algorithm 65 along with printer public key hash value 69 to create digital signature 70 which is essentially an encrypted form of printer public key hash value 69. Digital signature 70 is then stored in registry 41 under user1 entry 42 in sub-entry 44. As discussed above, user-specific private key 54 is preferably accessed through operating system 40 based on login id 45 for user1. In this manner, digital signature 70 is securely stored in registry 41 for subsequent use to authenticate a stored version of printer public key 25 before printer driver 60 uses printer public key 25 to encrypt print data.

Figure 5A:
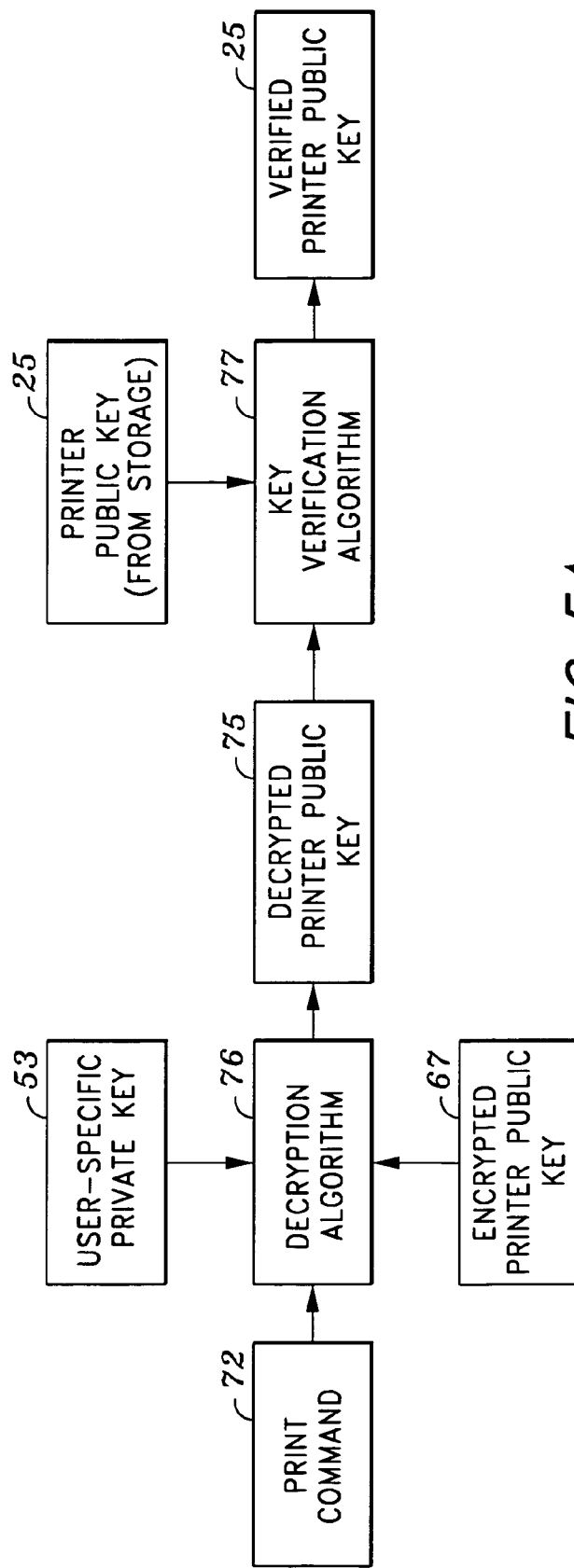
FIG. 5A is a block diagram for explaining the verification of a stored public key according to one embodiment of the present invention.

FIG. 5A is a block diagram which depicts the use of encrypted printer public key 67 which was created and stored as depicted in FIG. 4A for verifying the authenticity of printer public key 25 prior to using printer public key 25. In FIG. 5A, print command 72 is received from the user of computer 10 and preferably includes an indication that the desired print data is to be sent to printer 20 in a secure fashion. As seen in FIG. 5A, user-specific public key 53 is accessed, preferably through operating system 40 as discussed above. User-specific public key 53 is provided to decryption algorithm 76 along with encrypted printer public key 67 to obtain decrypted printer public key 75. Printer public key 25 is retrieved from storage area 62, or if computer 10 is a networked environment as depicted in FIG. 2, printer public key 25 can be retrieved from fixed disk 31 of server 30. Decrypted printer public key 75 and printer public key 25, which was retrieved from storage area 62, are then provided to key verification algorithm 77 to verify the authenticity of printer public key 25. If key verification algorithm 77 determines that decrypted that printer public key 75 matches printer public key 25, then printer public key 25 is authentic and has not been changed or corrupted since it was initially obtained from printer 20, or from server 30 as the case may be. If there is a mismatch, then printer public key 25 has either been corrupted, or has been modified in the case that it is was obtained from server 30 prior to use. Preferably, printer driver 60 generates an error message for display on display 11 of computer 10 to prompt the user to re-obtain a new, authenticated copy of printer public key 25 from printer 20, or from server 30, as the case may be.

Figure 5B:
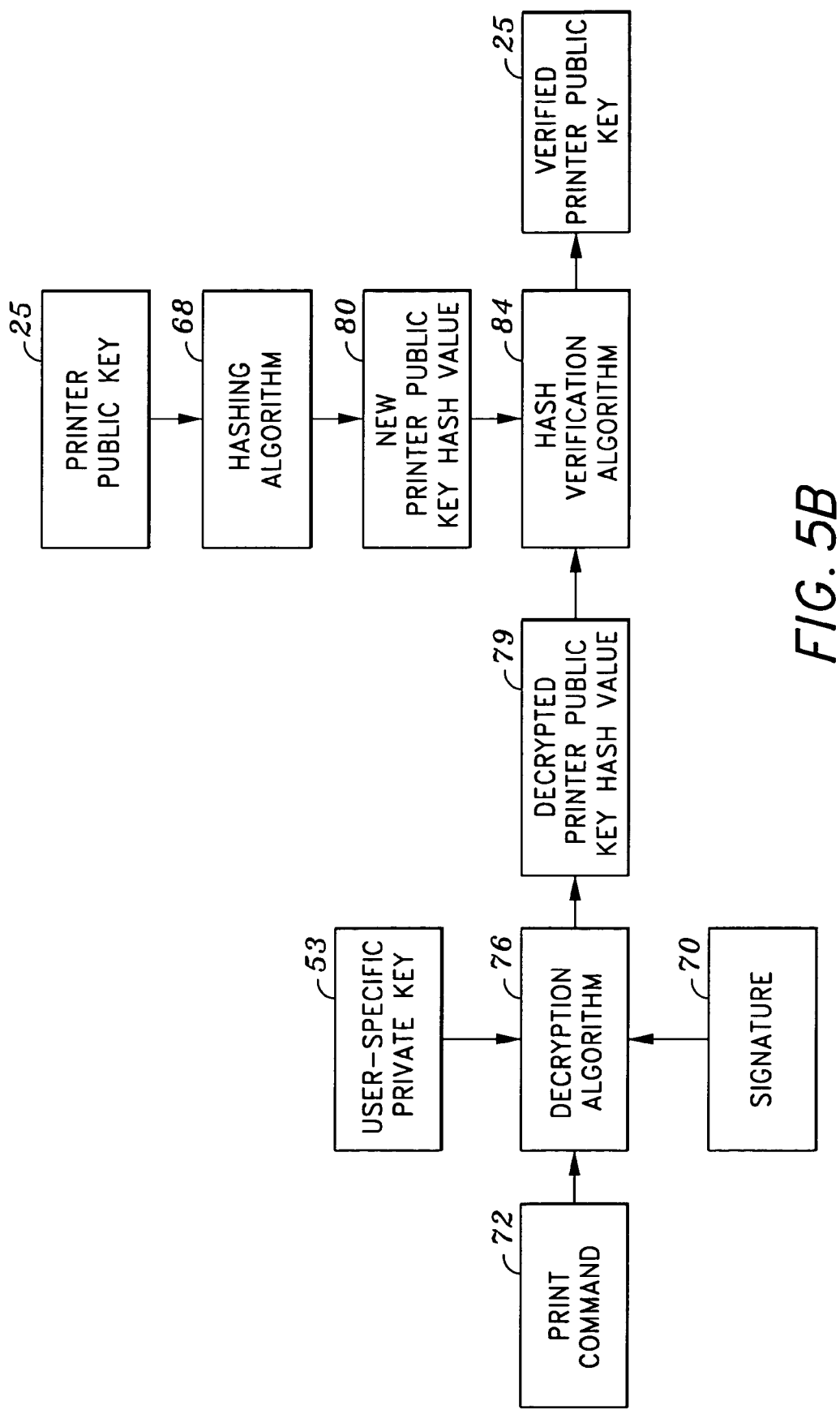
FIG. 5B is a block diagram for explaining the verification of a stored public key according to another embodiment of the present invention.

FIG. 5B is a block diagram which depicts the use of digital signature 70, which was created and stored as depicted in FIG. 4B, for verifying the authenticity of printer public key 25 prior to using printer public key 25. In FIG. 5B, print command 72 is received from the user of computer 10 and preferably includes an indication that the desired print data is to be sent to printer 20 in a secure fashion. As seen in FIG. 5B, user-specific public key 53 is accessed, preferably through operating system 40 as discussed above. User-specific public key 53 is provided to decryption algorithm 76 along with digital signature 70 to obtain decrypted printer public key hash value 79. Printer public key 25 is retrieved from storage area 62, or if computer 10 is a networked environment as depicted in FIG. 2, printer public key 25 can be retrieved from fixed disk 31 of server 30.

Printer public key 25 is then re-subjected to hashing algorithm 68 to generate new printer public key hash value 80. Decrypted printer public key hash value 79 and new printer public key hash value 80 are then provided to hash verification algorithm 84 to verify the authenticity of printer public key 25. If hash verification algorithm 84 determines that decrypted printer public key hash value 79 matches new printer public key hash value 80, then printer public key 25 is authentic and has not been changed or corrupted since it was initially obtained from printer 20, or from server 30 as the case may be. If there is a mismatch, then printer public key 25 has either been corrupted, or has been modified. For example, a new version of printer public key 25 may have been created and uploaded from printer 20 to server 30 since the first time that computer 10 obtained a version of printer public key 25 from server 30. Preferably, printer driver 60 generates an error message for display on display 11 of computer 10 to prompt the user to re-obtain a new, authenticated copy of printer public key 25 from printer 20, or from server 30, as the case may be.

Figure 6:
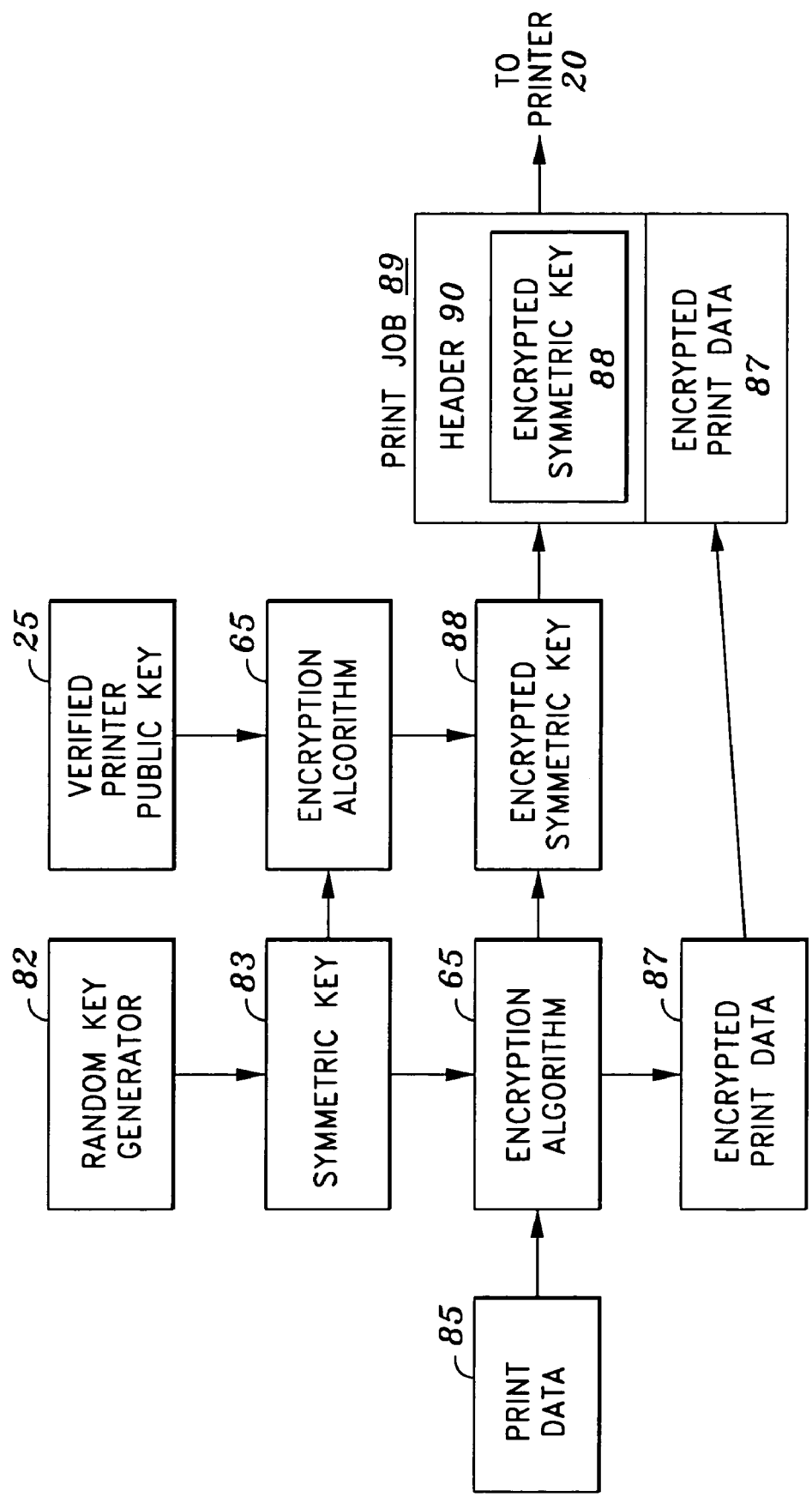
FIG. 6 is a block diagram for explaining the encryption of print data according to the present invention.

FIG. 6 is a diagram for explaining the encryption of print data in the case that printer public key 25 is determined to be authentic. As seen in FIG. 6, random key generator 82 is used to generate symmetric key 83, which is a cryptographic key that can be used to encrypt and to decrypt a data object. Random key generator 82 is preferably a function of operating system 40 and is accessed by a function call. Print data 85 and symmetric key 83 are then provided to encryption algorithm 65 to generate encrypted print data 87. In this regard, printer 20 will need a secure copy of symmetric key 83 to decrypt encrypted print data 87 for printing. Accordingly, printer public key 25 and symmetric key 83 are provided to encryption algorithm 65 to generate encrypted symmetric key 88. In this manner, the symmetric key can be passed to printer 20 in a secure fashion. Encrypted symmetric key 88 is then placed in header 90 of print job 89, which also contains encrypted print data 87. Print job 89 is then sent to printer 20 via connection 1. Even if print job 89 is intercepted on its way to printer 20, encrypted print data 87 cannot be properly decrypted because encrypted symmetric key 88 cannot be decrypted without the use of printer private key 23, which is securely stored in printer 20.

Figure 7:
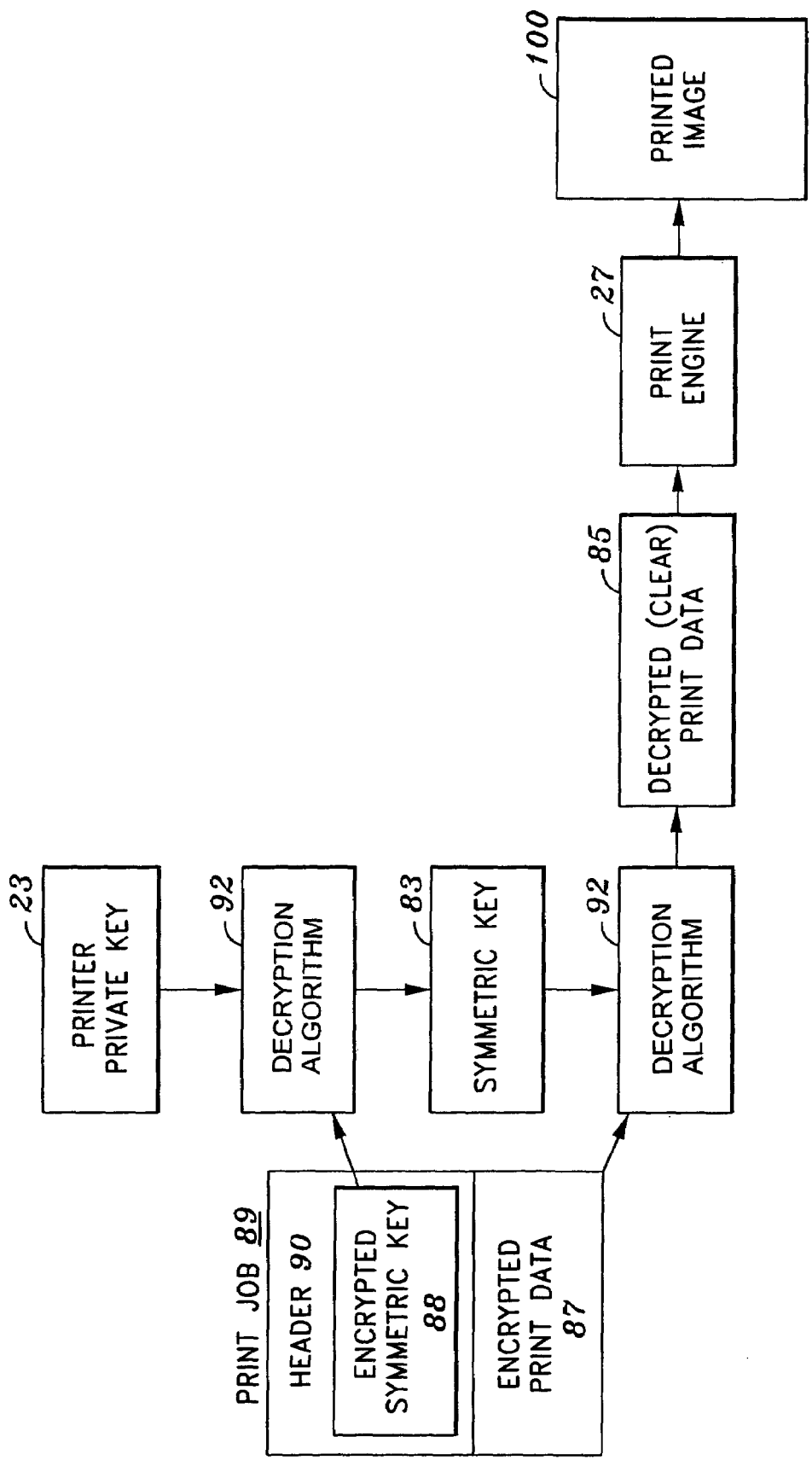
FIG. 7 is a block diagram for explaining the decryption of print data according to the present invention.

FIG. 7 is a diagram for explaining the decryption of encrypted print data 87 within printer 20. As seen in FIG. 7, print job 89 is received in printer 20. Printer private key 23 is then accessed from fixed storage 21 of printer 20 and is provided along with encrypted symmetric key 88 from print job header 90 to decryption algorithm 92 in order to retrieve symmetric key 83. Symmetric key 83 is then provided along with encrypted print data 87 to decryption algorithm 92 in order to generate decrypted (clear) print data 85. Print data 85 is then passed to print engine 27 of printer 20 which generates the print output on recording medium to create printed image 100. In this manner, print data is passed to printer 20 by using printer public key 25 in a secure fashion every time, without the use of an external certificate authority for verification of the authenticity of printer public key 25.

Figure 8B:
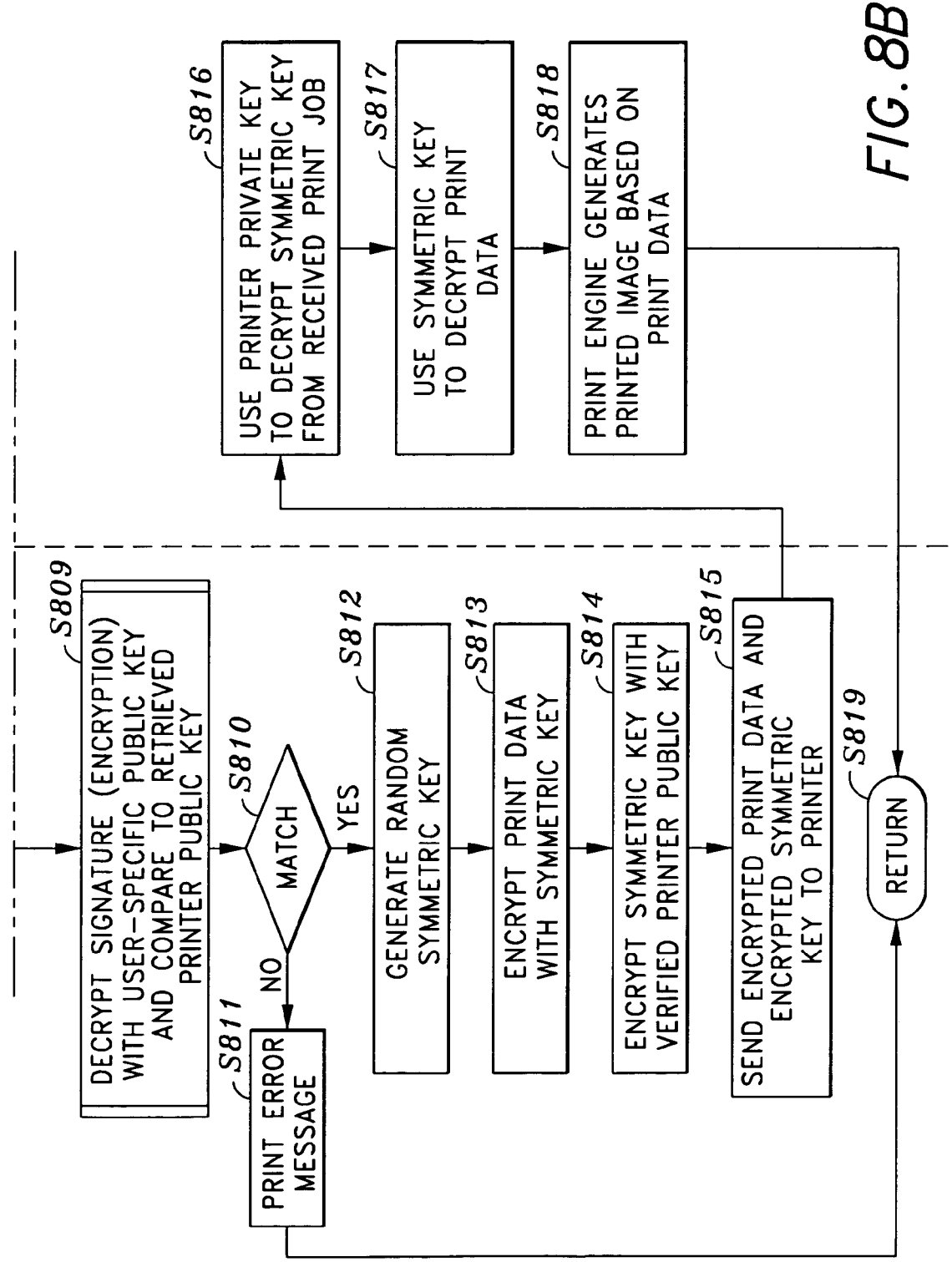
FIG. 8 is a flowchart for explaining the use of a public key according to one embodiment of the present invention.

FIG. 8 is a flowchart for explaining the use of a public key, in particular a printer public key, according to the present invention. In step S801, a user logs on to computer 10, preferably using a password. For sake of explanation, user1 is used as an example and provides login id 45 to verify that user1 is authorized to use computer 10. Next, in step S802, user-specific key pair 51 is obtained from key database 50 based on the identification of user1. Next, in step S803, printer public key 25 is sent to computer 10 from printer 20, (or from server 30 in the case that computer 10 is in a networked environment as in FIG. 2). Preferably, printer public key 25 is sent in response to a key request sent from computer 10 to printer 20, or server 30, as the case may be. Printer public key 25 is received in step S804 from printer 20 or from server 30 as the case may be. In step S805, printer public key 25 is preferably signed as explained above with respect to FIG. 4B, although it may alternatively be encrypted as explained above with respect to FIG. 4A.

Figure 9:
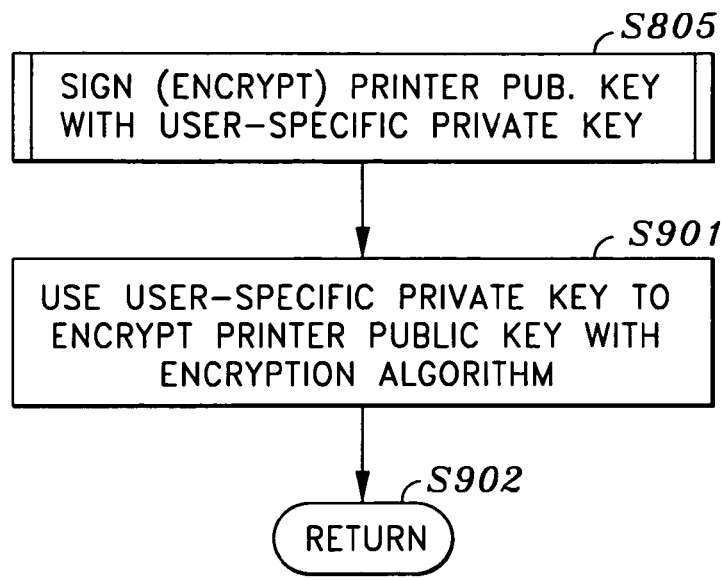
FIG. 9 is a flowchart for explaining the encryption of a public key according to one embodiment of the present invention.
Figure 10:
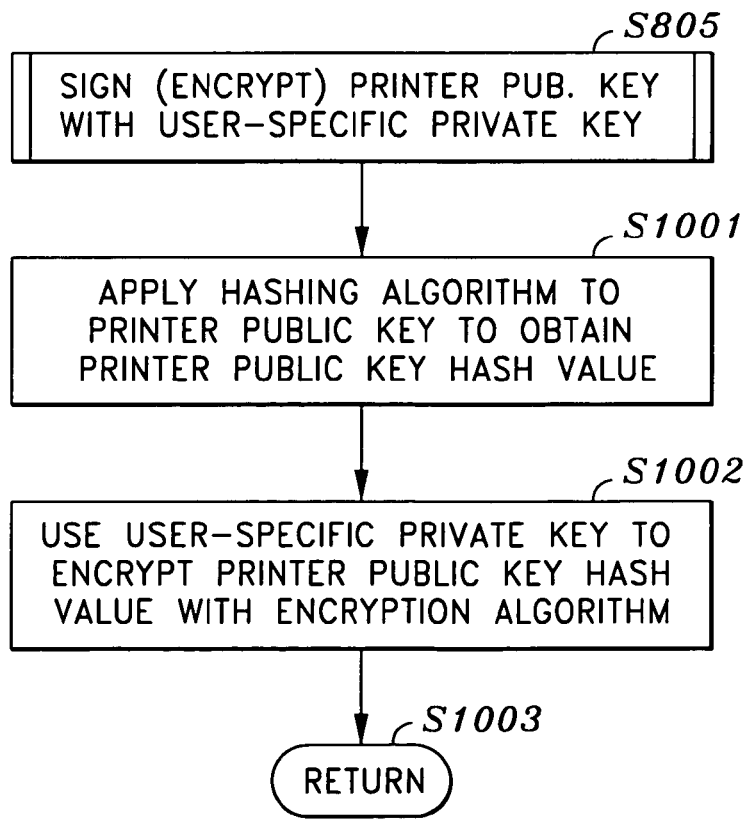
FIG. 10 is a flowchart for explaining the signing of a public key according to anther embodiment of the present invention.

The two aforementioned possibilities for step S805 are depicted in FIGS. 9 and 10, respectively. As seen in FIG. 9, user-specific private key 54 is used to fully encrypt printer public key 25 using encryption algorithm 65, thereby creating encrypted printer public key 67 (S901). Flow then passes to return (step S902) in FIG. 9. As seen in FIG. 10, hashing algorithm 68 is applied to printer public key 25 to create printer public key hash value 69 (step S1001). In step S1002, printer public key hash value 69 is encrypted with user-specific private key 54 to create digital signature 70. Flow then passes to return (step S1003) in FIG. 9.

Returning to FIG. 8, flow passes to step S806 in which printer public key 25 is stored in storage area 62 for subsequent use, and digital signature 70, (or encrypted printer public key 67) is securely stored in registry 41. In the alternative, it should be appreciated that printer public key 25 can be stored in fixed disk 31 of server 30 instead of in storage area 62 in the case that computer 10 is in a networked environment with server 30, as depicted in FIG. 2. As discussed above, printer public key 25 can be stored in fixed disk 31 of server 30 in the case that computer 10 is in a networked computing environment as depicted in FIG. 2. In such a case, computer 10 preferably accesses printer public key 25 from server 30 every time that computer 10 subsequently needs to encrypt data. This allows the printer driver to automatically detect the case where the version of printer public key 25 stored on server 30 has been updated by a system administrator. In step S807, computer 10 receives print command 72 from user1, which preferably includes an indication that the print job is to be sent to printer 20 in a secure fashion.

Figure 11:
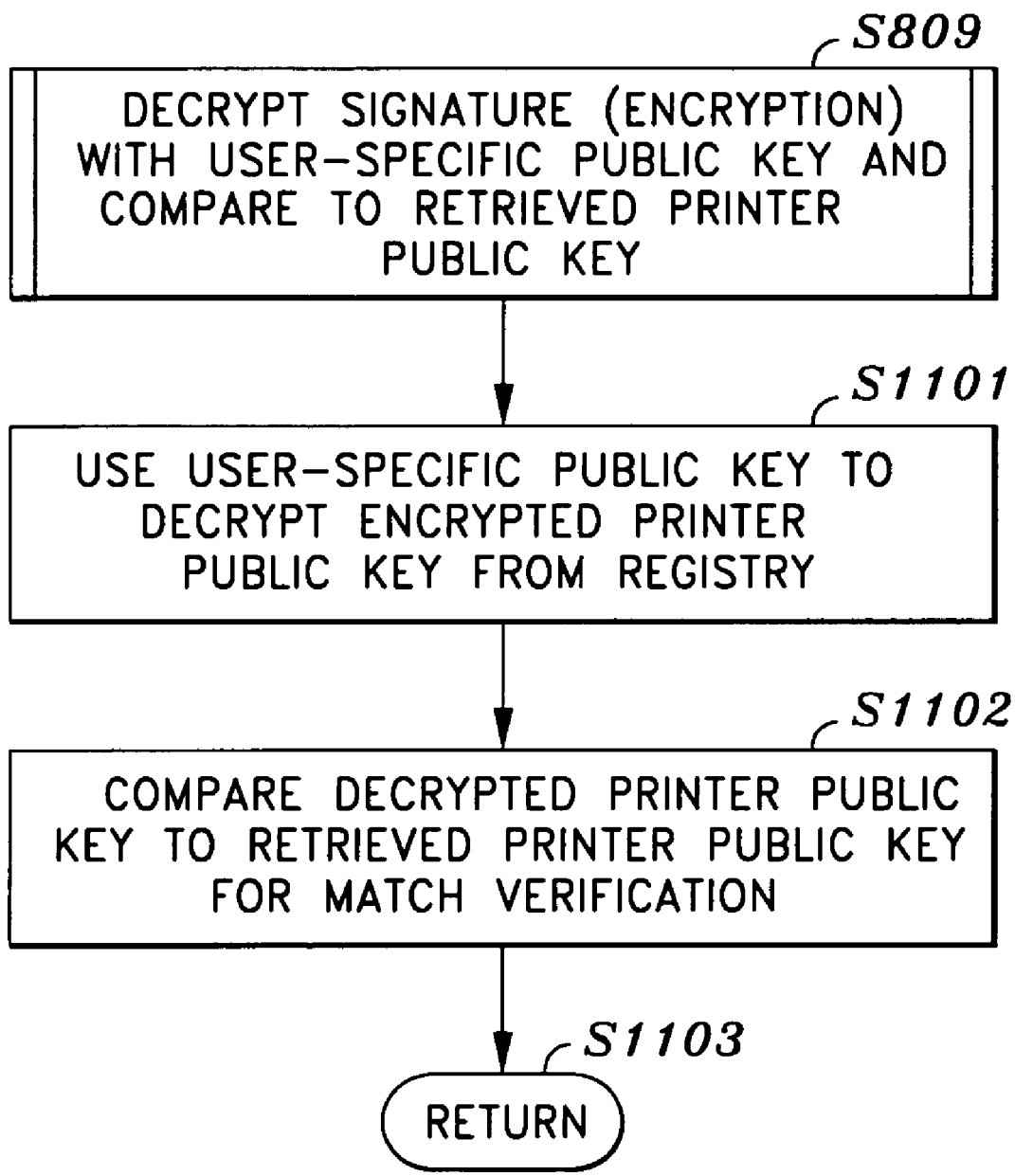
FIG. 11 is a flowchart for explaining the verification of a stored public key according to one embodiment of the present invention.

Next, printer public key 25 is retrieved from storage area 62 or from fixed disk 31 of server 30 as the case may be (step S808). In step S809, digital signature 70, or encrypted printer public key 67, is decrypted and provided to a verification algorithm along with printer public key 25 to verify the authenticity of printer public key 25. This step is different depending on whether printer public key 25 is signed or fully encrypted as discussed above with respect to FIGS. 9 and 10. FIG. 11 depicts the explanation of step S809 for the case in which printer public key 25 is fully encrypted. In step S1101, user-specific public key 53 is used to decrypt encrypted printer public key 67 which was retrieved from registry 41. Next, in step S1102, decrypted printer public key 75 and retrieved printer public key 25 are provided to key verification algorithm 77 for verifying that they match, thereby determining that printer public key 25 is authentic and can be used for proper encryption of print data. Flow then passes to return in step S1103.

Figure 12:
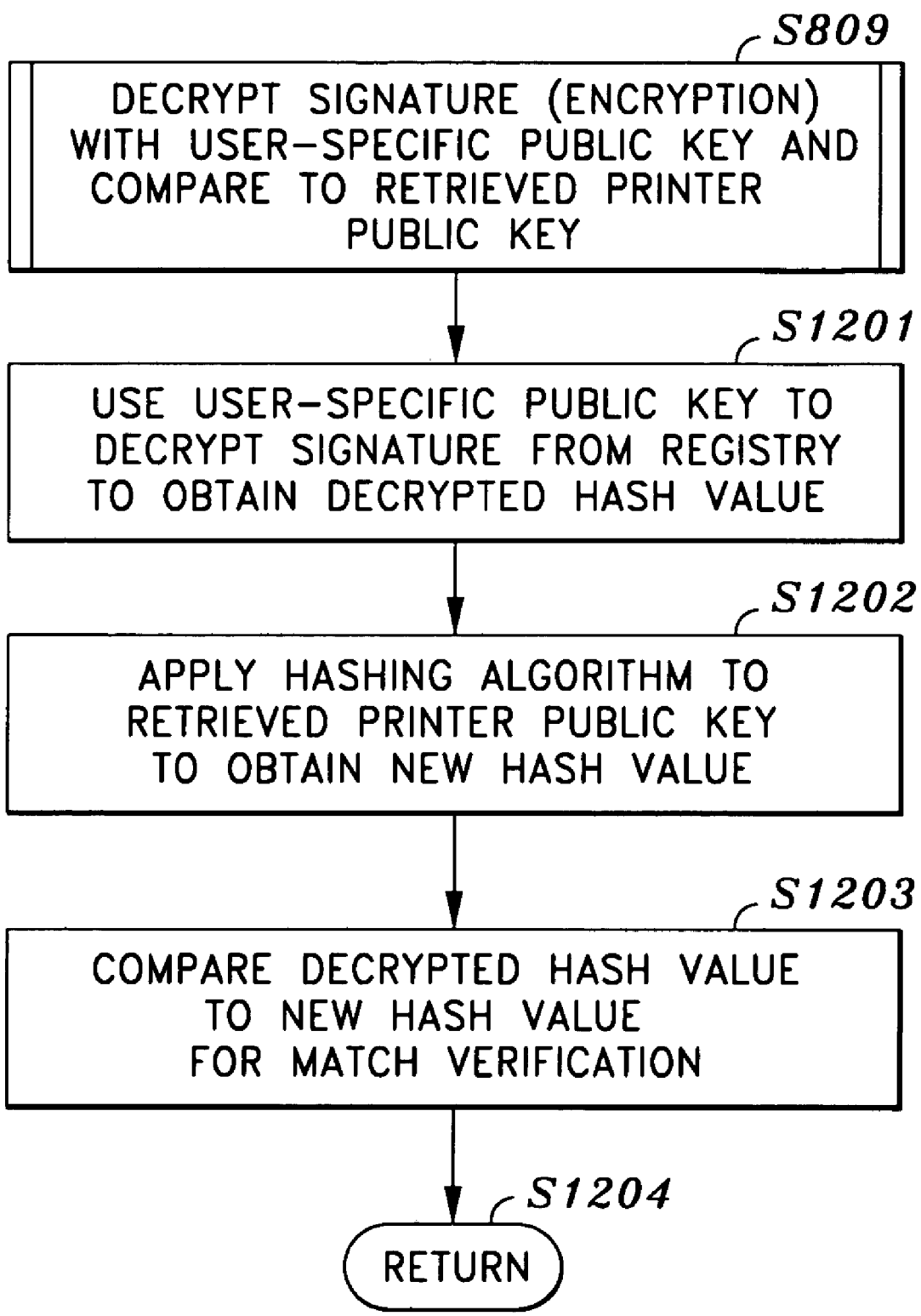
FIG. 12 is a flowchart for explaining the verification of a stored public key according to another embodiment of the present invention.

FIG. 12 depicts the case in which printer public key 25 is digitally signed to create digital signature 70. In step S1201, user-specific public key 53 is used to decrypt digital signature 70 which was retrieved from registry 41, thereby obtaining decrypted printer public key hash value 79. Next, in step S1202, hashing algorithm 68 is applied to printer public key 25 which was retrieved from either storage area 62 or from server 30, as the case may be, in order to obtain new printer public key hash value 80. In step S1203, decrypted printer public key hash value 79 and new printer public key hash value 80 are provided to hash verification algorithm 84 to determine whether the two hash values match, thereby confirming the authenticity of printer public key 25. Flow then passes to return in step S1204.

Returning to FIG. 8, flow passes to step S810 in which it is determined if there was a match in the verification performed in step S809. If there has been a match, flow passes to step S812. If there is not a match, flow passes to step S811 in which an error message is generated for display on display 11 of computer 10, and then flow passes to return in step S819. In step S812, random key generator 82 is used to generate symmetric key 83. In step S813, print data 85 is encrypted with symmetric key 83 using encryption algorithm 65 to generate encrypted print data 87. Next, in step S814, symmetric key 83 is encrypted with verified printer public key 25 using encryption algorithm 65 to generate encrypted symmetric key 88. Encrypted symmetric key 88 and encrypted print data 87 are placed in print job 89 and sent to printer 20 (step S815). Flow then passes to step S816 wherein printer 20 receives print job 89 and applies printer private key 23 via decryption algorithm 92 to decrypt encrypted symmetric key 88, thereby retrieving symmetric key 83. Symmetric key 83 is then applied to encrypted print data 87 to retrieve decrypted (clear) print data 85 (step S817). Decrypted print data 85 is then sent to print engine 27 of printer 20 to generate printed image 100 based on print data 85 (step S818). Flow then passes to return in step S819.

Figure 13:
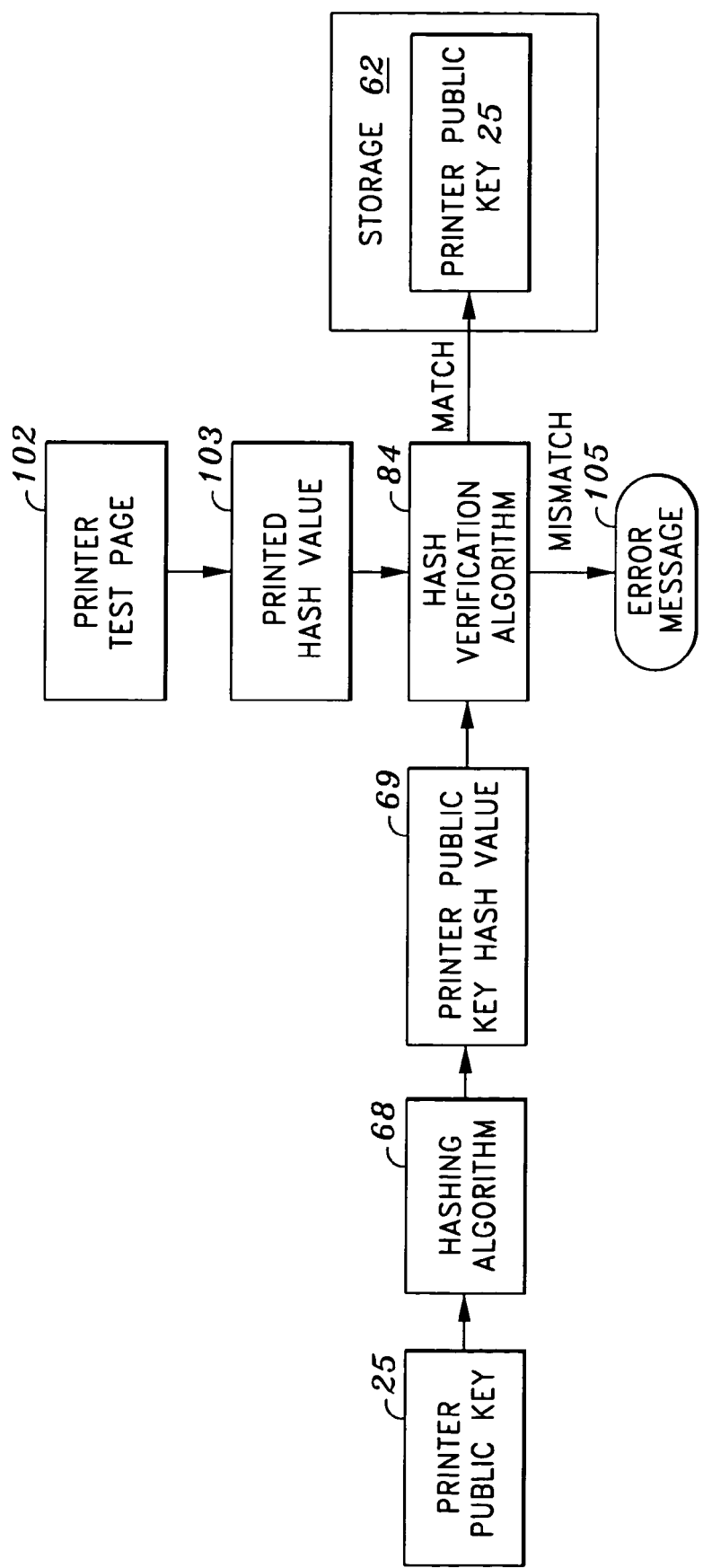
FIG. 13 is a block diagram for explaining an initial verification of a received public key according to one embodiment of the present invention.

FIG. 13 depicts a preferred arrangement of the present invention for initial authentication a received public key, such as printer public key 25 received from printer 20. In particular, the arrangement performs authentication when printer public key 25 is first obtained by computer 10 in order to make sure that computer 10 properly received a correct copy of printer public key 25. As seen in FIG. 13, printer public key 25 is obtained from printer 20 and is subjected to hashing algorithm 68 to generate printer public key hash value 69.

Next, printer test page 102 is generated at printer 20 in response to a command which is preferably provided at the front panel of printer 20 by the user of computer 10. Printer test page contains a printed hash value 103 of which is the correct hash value for printer public key 25. Printed hash value 103 is entered into computer 10 by the user and is provided to hash verification algorithm 84 along with printer public key hash value 69. Hash verification algorithm 84 determines whether the two hash values match in order to verify the authenticity of received printer public key 25. If there is a match, then computer 10 accepts printer public key 25 as an authentic copy from printer 20 and stores it into storage area 62 for subsequent use. If there is not a match, then an error message 105 is generated for display on display 11 of computer 10 to prompt the user to take action, such as sending another request to printer 20 for printer public key 25, or such as re-entering printed hash value 103 into computer 10.

Figure 14:
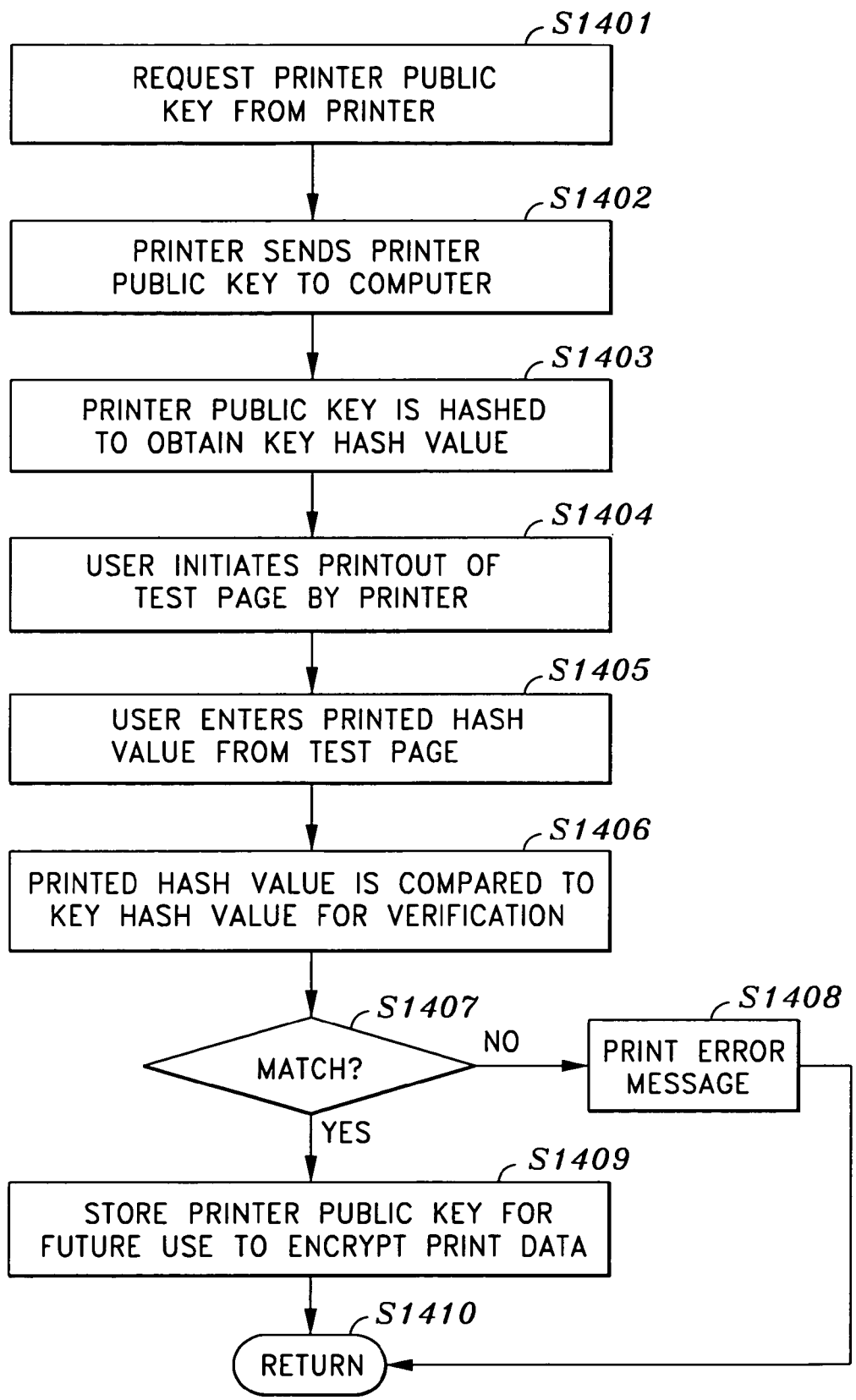
FIG. 14 is a flowchart for explaining an initial verification of a received public key according to one embodiment of the present invention.

FIG. 14 is a flowchart for explaining the initial authentication of printer public key 25 depicted in FIG. 13. In step S1401, printer public key 25 is requested from printer 20. Printer 20 then sends printer public key 25 to computer 10 in step S1402. Printer public key 25 is then subjected to hashing algorithm 68 to generate printer public key hash value 69 (step S1403). Next, printer test page 102 is generated at printer 20 in response to a command which is preferably provided at the front panel of printer 20 by the user of computer 10 (step S1404). Printer test page contains a printed hash value 103 of which is the correct hash value for printer public key 25.

In step S1405, printed hash value 103 is entered into computer 10 by the user, preferably in a dialog window provided on display 11 of computer 10. Printed hash value 103 is then provided to hash verification algorithm 84 along with printer public key hash value 69 in step S1406. Hash verification algorithm 84 determines whether the two hash values match in order to verify the authenticity of received printer public key 25. In step S1407, it is determined if a match was established in step S1406. If there is a match, then flow passes to step S1409 in which computer 10 accepts printer public key 25 as an authentic copy from printer 20 and stores it into storage area 62 for subsequent use. Flow then passes to return at step S1410. If there is not a match at step S1407, then flow passes to step S1408 where an error message is generated for display on display 11 of computer 10 to prompt the user to take action, such as sending another request to printer 20 for printer public key 25, or such as re-entering printed hash value 103 into computer 10. Flow then passes to return at step S1410.

In this manner, secure printing is provided through the use of a public key without having to use an external certificate authority to verify the authenticity of the public key every time that the public key is need for encryption purposes. In particular, a target public key such as a printer public key can be securely maintained on a computing device for subsequent use to encrypt data. Accordingly, the encryption (signing) and subsequent verification of the target public key is performed locally with a locally maintained user-specific key pair, thereby allowing authenticity of the target public key to be easily verified before each use.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for securely storing a public key for encryption of data in a computing device, the method using a user-specific key pair which is securely stored in the computing device, the method comprising:
   a user authenticating step of authenticating a user who logs into the computing device;
   a registering step of registering the user-specific key pair of the user authenticated by said authenticating step, wherein the user-specific key pair is registered in a secure registry;
   a receiving step of receiving a target public key corresponding to a target device;
   an obtaining step of obtaining the user-specific key pair from the secure registry, wherein the user-specific key pair is obtained from a key function call which is supported by an operating system executing in the computing device and wherein the key function call is provided with user login information for verification of the user's authorization to use the computing device;
   a key encrypting step of using a user-specific private key from the user-specific key pair to create a target key verifier based on the target public key;
   a storing step of storing the target key verifier and the target public key in a storage area;
   a retrieving step of retrieving the target key verifier and the target public key from the storage area;
   a recognizing step of recognizing a printing instruction;
   a verification step of applying, in response to recognizing the printing instruction, a user-specific public key from the user-specific key pair to the target key verifier for verifying the authenticity of the target public key, wherein said verification step verifies whether the public key in the storage area and the public key in the secure registry correspond to each other; and
   a data encrypting step of encrypting data with the target public key, in the case that the authenticity of the target public key is verified, thereby creating encrypted data for transmission to the target device.

2. A method according to claim 1, wherein the operating system securely maintains a user-specific key pair for each of a plurality of users of the computing device.

3. A method according to claim 2, wherein each user-specific key pair can only be accessed by providing the operating system with user identification data corresponding to the user-specific key pair.

4. A method according to claim 1, wherein the target key verifier created in the key encrypting step is an encrypted version of the target public key.

5. A method according to claim 4, wherein the verification step includes decrypting the target key verifier with the user-specific public key using a decryption algorithm.

6. A method according to claim 5, wherein the verification step further includes using a key verification algorithm to compare the decrypted target key verifier to the target public key for verifying the authenticity of the target public key.

7. A method according to claim 6, wherein the verification step is performed by a verification function call which is supported by an operating system executing in the computing device.

8. A method according to claim 1, wherein the target key verifier created in the key encrypting step is a digital signature of the target public key.

9. A method according to claim 8, wherein the digital signature of the target public key is created by applying a hashing algorithm to the target public key to obtain a target key hash, and then encrypting the target key hash with the user-specific private key using an encryption algorithm.

10. A method according to claim 8, wherein the digital signature of the target public key is created by applying a hashing algorithm to the target public key to obtain a target key hash, and then subjecting the target key hash to an encryption algorithm.

11. A method according to claim 10, wherein the verification step includes decrypting the target key verifier with the user-specific public key using a decryption algorithm to obtain a decrypted target key hash.

12. A method according to claim 11, wherein the verification step further includes reapplying a hashing algorithm to the target public key to obtain a new target key hash and using a hash verification algorithm to compare the decrypted target key hash to the new target key hash for verifying the authenticity of the target public key.

13. A method according to claim 12, wherein the verification step is performed by a verification function call which is supported by an operating system executing in the computing device.

14. A method according to claim 1, wherein the receiving step includes applying a hashing algorithm to the received target public key to obtain a received target key hash and using a hash verification algorithm to compare the received target key hash to a test target key hash for verifying the authenticity of the received target public key.

15. A method according to claim 14, wherein the test target key hash is input by a user.

16. A method according to claim 15, wherein the target device is a printer and wherein the test target key hash is obtained from a test page printed by the printer.

17. A method according to claim 1, wherein the target device is a printer and the target public key is a printer public key.

18. A method according to claim 17, wherein, in the receiving step, the printer public key is received in response to a key request sent to the printer.

19. A method according to claim 17, wherein the method is performed in a printer driver executing on the computing device.

20. A method for securely storing a printer public key for encryption of print data in a computing device, the method using a user-specific key pair which is securely stored in the computing device, the method comprising:

a user authenticating step of authenticating a user who logs into the computing device;

a registering step of registering the user-specific key pair of the user authenticated by said authenticating step, wherein the user-specific key pair is registered in a secure registry;

a receiving step of receiving a printer public key corresponding to a printer;

an obtaining step of obtaining a user-specific key pair from a secure registry upon receipt of a corresponding user identification, wherein the user-specific key pair is obtained from a key function call which is supported by an operating system executing in the computing device and wherein the key function call is provided with user login information for verification of the user's authorization to use the computing device;

a first hashing step of applying a hashing algorithm to the printer public key to create a first printer key hash;

an encryption step of applying an encryption algorithm to encrypt the first printer key hash with a user-specific private key from the user-specific key pair, thereby creating a printer key signature;

a storing step of storing the printer key signature and the printer public key in a storage area;

a retrieving step of retrieving the printer key signature and the printer public key from the storage area;

a second hashing step of applying the hashing algorithm to the retrieved printer public key to create a second printer key hash;

a decrypting step of applying a decryption algorithm to decrypt the printer key signature with a user-specific public key from the user-specific key pair, thereby retrieving the first printer key hash;

a recognizing step of recognizing a printing instruction;

a verification step of applying, in response to recognizing the printing instruction, a verification algorithm to compare the first printer key hash with the second printer key hash, for verifying the authenticity of the retrieved printer public key, wherein said verification step verifies whether the public key in the storage area and the public key in the secure registry correspond to each other; and a print data encrypting step of applying an encryption algorithm to print data using the retrieved printer public key, in the case that the authenticity of the retrieved printer public key is verified, to create encrypted print data for transmission to the printer.

21. A method for authentication of a printer public key received by a computing device, the method comprising:

a user authenticating step of authenticating a user who logs into the computing device;

a registering step of registering the user-specific key pair of the user authenticated by said authenticating step, wherein the user-specific key pair is registered in a secure registry;

a first receiving step of receiving in the computing device a printer public key corresponding to a printer;

a hashing step of applying a hashing algorithm to the printer public key to create a first printer key hash;

a second receiving step of receiving in the computing device a predetermined second printer key hash obtained from a test page printed by the printer, wherein the second printer key hash is input into the computing device by a user-input means connected to the computing device;

a recognizing step of recognizing a printing instruction;

a verification step of applying, in response to recognizing the printing instruction, a verification algorithm to compare the first printer key hash with the second printer key hash, for verifying the authenticity of the received printer public key, wherein said verification step verifies whether the public key in the storage area and the public key in the secure registry correspond to each other; and a storing step of storing, in the case that the authenticity of the received printer public key is verified in the verification step, the received printer public key in a memory area of the computing device.

22. A computing device for authenticating a public key for encryption of data, said computing device comprising:

a program memory for storing process steps executable to perform a method according to any of claims 1, 2 to 4 or 5 to 21; and a processor for executing the process steps stored in said program memory.

23. Computer-executable process steps stored on a computer readable medium, said computer-executable process steps for authenticating a public key for encryption of data, said computer-executable process steps comprising process steps executable to perform a method according to any of claims 1, 2 to 4 or 5 to 21.

24. A computer-readable medium which stores computer-executable process steps, the computer-executable process steps to authenticate a public key for encryption of data, said computer-executable process steps comprising process steps executable to perform a method according to any of claims 1, 3 to 4 or 5 to 21.

25. An information apparatus which transmits encrypted data to a target device, the information apparatus securely storing a public key for encryption of the data and utilizing a user-specific key pair which is securely stored in the apparatus, comprising:

authenticating means for authenticating a user who logs into the computing device;

registering means for registering the user-specific key pair of the user authenticated by said authenticating means, wherein the user-specific key pair is registered in a secure registry;

receiving means for receiving a target public key corresponding to a target device;

obtaining means for obtaining a user-specific key pair from a secure registry, wherein the user-specific key pair is obtained from a key function call which is supported by an operating system executing in the computing device and wherein the key function call is provided with user login information for verification of the user's authorization to use the computing device;

key encrypting means for using a user-specific private key from the user-specific key pair to create a target key verifier based on the target public key;

storing means for storing the target key verifier and the target public key;

retrieving means for retrieving the target key verifier and the target public key from the storing means;
recognizing means for recognizing a printing instruction;
verification means for applying, in response to recognizing the printing instruction, a user-specific public key from the user-specific key pair to the target key verifier for verifying the authenticity of the target public key, wherein said verification means verifies whether the public key in the storage area and the public key in the secure registry correspond to each other; and
data encrypting means for encrypting data with the target public key, in the case that the authenticity of the target public key is verified, thereby creating encrypted data for transmission to the target device.

* * * * *

UNITED STATES PATENT AND TRADEMARK OFFICE
CERTIFICATE OF CORRECTION

PATENT NO. : 7,305,556 B2
APPLICATION NO. : 10/010974
DATED : December 4, 2007
INVENTOR(S) : Royce E. Slick et al.

It is certified that error appears in the above-identified patent and that said Letters Patent is hereby corrected as shown below:

COLUMN 9
    Line 37, "that decrypted that" should read --that decrypted--; and
    Line 43, "is was" should read --was--.

COLUMN 12
    Line 25, "authentication" should read --authentication of--.

COLUMN 13
    Line 19, "need" should read --needed--.

Signed and Sealed this

Second Day of September, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,305,556 B2 |
| APPLICATION NO. | : 10/010974 |
| DATED | : December 4, 2007 |
| INVENTOR(S) | : Royce E. Slick et al. |

Page 1 of 1

It is certified that error appears in the above-identified patent and that said Letters Patent is hereby corrected as shown below:

<u>COLUMN 16</u>
Claim 24 Line 41, "1, 3 to 4 or 5 to 21" should read --1 to 21--.

Signed and Sealed this

Sixteenth Day of March, 2010

David J. Kappos
*Director of the United States Patent and Trademark Office*